(12) United States Patent
Grimberg

(10) Patent No.: US 10,660,402 B2
(45) Date of Patent: May 26, 2020

(54) ELECTRONICALLY ENHANCED SHOE GRIP

(71) Applicant: Michael Fredrick Grimberg, Innisfail (CA)

(72) Inventor: Michael Fredrick Grimberg, Innisfail (CA)

(*) Notice: Subject to any disclaimer, the term of this patent is extended or adjusted under 35 U.S.C. 154(b) by 21 days.

(21) Appl. No.: 16/027,911

(22) Filed: Jul. 5, 2018

(65) Prior Publication Data

US 2019/0008231 A1 Jan. 10, 2019

Related U.S. Application Data

(60) Provisional application No. 62/529,358, filed on Jul. 6, 2017.

(51) Int. Cl.
| | | |
|---|---|---|
| *A43C 15/00* | (2006.01) |
| *A43B 23/28* | (2006.01) |
| *A43B 13/22* | (2006.01) |
| *H02N 2/18* | (2006.01) |
| *A43B 5/18* | (2006.01) |
| *A43B 3/00* | (2006.01) |
| *A43B 3/16* | (2006.01) |
| *A43C 15/02* | (2006.01) |

(52) U.S. Cl.
CPC ............. *A43B 13/22* (2013.01); *A43B 5/18* (2013.01); *H02N 2/18* (2013.01); *H02N 2/181* (2013.01); *A43B 3/0005* (2013.01); *A43B 3/0015* (2013.01); *A43B 3/16* (2013.01); *A43B 13/223* (2013.01); *A43C 15/02* (2013.01)

(58) Field of Classification Search
CPC ..... A43B 13/22; A43B 3/0005; A43B 3/0015; A43B 7/36; A43C 15/02; H02N 1/04; H02N 2/18; H01L 41/113
USPC ................. 36/25 R; 361/223, 224; 310/311
See application file for complete search history.

(56) References Cited

U.S. PATENT DOCUMENTS

| | | | | |
|---|---|---|---|---|
| 7,310,895 B2* | 12/2007 | Whittlesey | ........... | A43B 3/0005 36/137 |
| 7,551,419 B2* | 6/2009 | Pelrine | ................... | H02N 13/00 361/234 |
| 7,552,549 B2* | 6/2009 | Whittlesey | ........... | A43B 3/0005 36/127 |
| 2008/0089002 A1* | 4/2008 | Pelrine | ................... | H02N 13/00 361/234 |

(Continued)

FOREIGN PATENT DOCUMENTS

DE 10131354 A1 3/2003

OTHER PUBLICATIONS

Autumn et al., "Mechanisms of Adhesion in Geckos", Integrative and Comparative Biology (2002), 42(6), pp. 1081-1090.

(Continued)

*Primary Examiner* — Jameson D Collier
(74) *Attorney, Agent, or Firm* — Greer, Burns & Crain, Ltd.

(57) ABSTRACT

A shoe apparatus with electronic grip enhancement is disclosed. In particular, the shoe includes: an electrical energy storage device such as a capacitor or battery; a piezoelectric generator configured to generate electricity when the user takes a step in the shoe; and a sole including an electrostatic adhesive portion configured to augment the grip of the shoe.

14 Claims, 3 Drawing Sheets

(56) References Cited

U.S. PATENT DOCUMENTS

| | | | | |
|---|---|---|---|---|
| 2008/0211341 | A1* | 9/2008 | Pelrine | B62D 57/00 310/309 |
| 2010/0271746 | A1* | 10/2010 | Pelrine | H02N 13/00 361/234 |
| 2013/0020986 | A1* | 1/2013 | Linzon | A43B 3/0015 320/107 |
| 2013/0036633 | A1 | 2/2013 | Lee | |
| 2013/0104425 | A1* | 5/2013 | Kalra-Lall | A43B 3/0015 36/103 |
| 2014/0272272 | A1 | 9/2014 | Spenko et al. | |
| 2015/0272263 | A1* | 10/2015 | Szent-Miklosy | A43B 3/0015 36/25 R |
| 2016/0344309 | A1* | 11/2016 | Otagiri | H02N 2/18 |
| 2017/0087728 | A1* | 3/2017 | Prahlad | B25J 15/0085 |
| 2017/0208890 | A1* | 7/2017 | Torvinen | A43B 3/0015 |
| 2017/0317609 | A1* | 11/2017 | Kim | H02N 1/04 |
| 2018/0125147 | A1* | 5/2018 | Folske | A43B 3/0015 |

OTHER PUBLICATIONS

Barry et al., "Tribology, Friction and Traction: Understanding Shoe-Surface Interaction", Footwear Science (2013), 5 (3), pp. 137-145.

Calle et al., "Dust Particle Removal by Electrostatic and Dielectrophoretic Forces with Applications to NASA Exploration Missions", Proceeding on the ESA Annual Meeting on Electrostatics (2008), paper, pp. 1-14.

Chen et al., "A Gecko-Inspired Wall-Climbing Robot Based on Electrostatic Adhesion Mechanism", Proceeding of the IEEE International Conference on Robotics and Biomimetics (2013), pp. 396-401.

Dadkhah et al., "A Self-Aligning Gripper Using an Electrostatic /Gecko-Like Adhesive", IEEE/RSJ International Conference on Intelligent Robots and Systems (2016), pp. 1006-1011.

Divert et al., "Mechanical Comparison of Barefoot and Shod Running", International Journal of Sports Medicine (2005), 26(7), pp. 593-598.

Divert et al., "Barefoot-Shod Running Differences: Shoe or Mass Effect?", International Journal of Sports Medicine (2008), 29(6), pp. 512-518.

Franz et al., "Metabolic Cost of Running Barefoot versus Shod: Is Lighter Better?", Medicine & Science in Sports & Exercise (2012), 44(8), pp. 1519-1525.

Frederick, E.C., "Optimal Frictional Properties for Sport Shoes and Sport Surfaces", International Symposium on Biomechanics in Sports (1993), pp. 15-22.

Kendall, C.J., "Parasitic Power Collection in Shoe Mounted Devices", Thesis, Massachusetts Institute of Technology (1998), pp. 1-27.

Kymissis et al., "Parasitic Power Harvesting in Shoes", ISWC '98 Proceedings of the 2nd IEEE International Symposium on Wearable Computers (1998), pp. 1-8.

Liu et al., "Wall Climbing Robot Using Electrostatic Adhesion Force Generated by Flexible Interdigital Electrodes", International Journal of Advanced Robotic Systems (2013), 10(36), pp. 1-9.

Prelrine, R., "Microrobot Inspectors: Electroadhesive Wall Climbing Robots and More", PowerPoint, SRI International (2009), pp. 1-20.

Ruffatto et al., "Optimization and Experimental Validation of Electrostatic Adhesive Geometry", Paper, IEEE Aerospace Conference (2013), pp. 1-8.

Ruffatto et al., "Experimental Results of a Controllable Electrostatic/ Gecko-Like Adhesive on Space Materials", Paper, IEEE Aerospace Conference Proceedings (2014), pp. 1-7.

Starner et al. "Human Generated Power for Mobile Electronics", Low-Power Electronics Design (2004), 1st edition, pp. 1-30.

Valiant, G. A., "Designing Proper Athletic Shoe Outsole Traction", Published Dec. 1, 1997, retrieved from RubberNews.com.

\* cited by examiner

ELECTRONICALLY ENHANCED SHOE GRIP

CROSS-REFERENCE TO RELATED APPLICATIONS

This application claims the benefit of U.S. Provisional Application No. 62/529,358, filed Jul. 6, 2017, which is incorporated herein by reference in its entirety.

FIELD OF THE INVENTION

The invention relates to enhancing the grip of a shoe.

BACKGROUND

In the past, attempts to improve the grip of a shoe have involved changing the materials or structure of the soles.

For example, US patent application 2013/036,633 discloses a non-slip sole structure of anti-slip shoes used for stream trekking and fishing is made of a material with a large coefficient of friction such as unwoven fabric and having regular or irregular hollow grooves formed at predetermined positions of the sole.

DE 101-31-354 describes a shoe sole having a non-slip structure with non-slip components, oriented on main alignments in zones which match the image of the human foot, to transmit the dynamics of natural walking movements into a maximum non-slip effect over the whole sole area. Some zones retain traction during the shifts of the body center of gravity, and the outer edge zone prevents slipping at the edge.

SUMMARY

In accordance with the invention, there is provided a shoe apparatus (e.g. an apparatus for attaching to a shoe or a shoe itself) comprising:
  an electrical energy storage device;
  a piezoelectric generator configured to generate electricity when the user takes a step and to transmit the generated electricity to the electrical energy storage device; and
  a sole comprising an electrostatic adhesive portion configured to augment the grip of the sole in response to being activated by electricity received from the electrical energy storage device.

The electrical energy storage device may be a battery or a capacitor.

The electrostatic adhesive portion may be activated in response to a force being applied to the sole exceeding a predetermined threshold.

The shoe apparatus may comprise sensors configured to detect torsional force applied to the shoe apparatus, wherein the shoe apparatus is configured to deactivate the electrostatic adhesive portion in response to detecting a torsional force exceeding a predetermined threshold.

The shoe apparatus may comprise sensors to determine forces applied to the shoe apparatus by a foot.

The electrostatic adhesive portion may comprise an electrostatic dry adhesive.

The shoe apparatus may be configured to activate the electrostatic adhesive portion a predetermined time period after impact of the sole on an underlying surface.

The shoe apparatus may comprise a charging interface to allow charging of the electrical energy storage device.

The shoe apparatus may be configured to apply a cleaning cycle to the electrostatic adhesive, the cleaning cycle comprising alternating the electrostatic field of the electrostatic adhesive portion to repel dust and dirt from the surface.

The shoe apparatus may be configured to deactivate the electrostatic adhesive portion in response to detecting that the user is lifting the shoe from an underlying surface.

The shoe apparatus may be configured to deactivate the electrostatic adhesive in response to detecting a decrease in pressure at the bottom of the heel.

According to a further aspect, there is provided a shoe comprising the shoe apparatus described herein.

According to a further aspect, there is provided a retrofittable shoe attachment comprising:
  a shoe apparatus as described herein; and
  one or more connectors configured to connect the retrofittable shoe attachment to an existing shoe sole.

A shoe may encompass any type of footwear intended to protect and comfort the human foot. A shoe in this context may include: a sandal, a training shoe, a boot, a dance shoe, an athletic shoe, a rubber boot, a running shoe (e.g. with or without spikes), a dress shoe, a hiking boot.

The technology may be applied to retrofittable version of the device. The components of the retrofittable shoe attachment may include
  an electrical energy storage device;
  a piezoelectric generator configured to generate electricity when the user takes a step in the shoe and to transmit the generated electricity to the electrical energy storage device;
  a sole comprising an electrostatic adhesive portion configured to augment the grip of the shoe in response to being activated by electricity received from the electrical energy storage device.

The retrofittable shoe attachment may comprise connectors configured to connect the retrofittable shoe attachment to an existing shoe sole.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION

Figure 1:
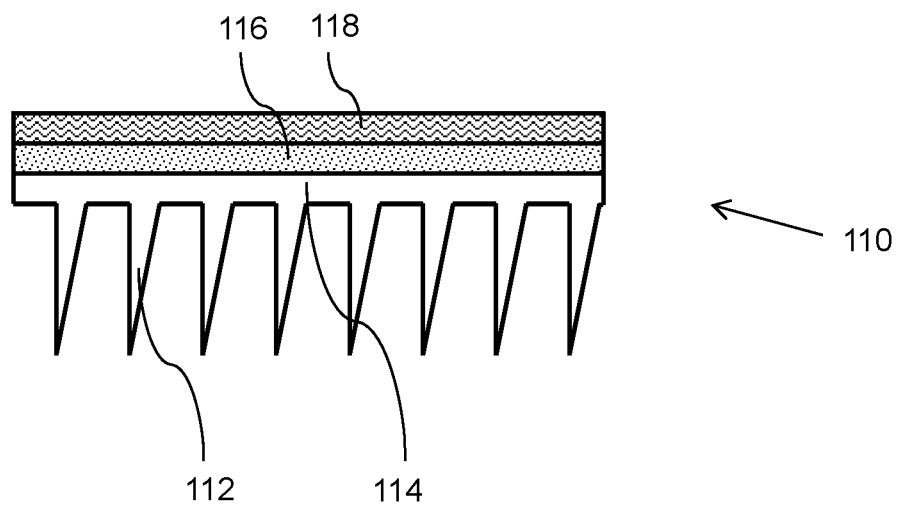
FIG. 1 is a cross-section view of an electrostatic adhesive.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

The present technology relates to electronically enhancing the grip of a shoe (e.g. an athletic shoe). In this method, the grip of the shoe is increased by using electrostatic adhesive (such as an electrostatic dry adhesive or EDA) on the sole of the shoe. The electrostatic adhesive is powered by piezoelectric power harvested from the motion of the user (e.g. through walking, running and/or jumping).

EDA is a combination of two adhesive technologies: electrostatic adhesives and dry adhesives where the resulting adhesive is greater than the sum of the parts. Electrostatic adhesive uses an electrical charge to induce an electrostatic attraction between two materials. Dry adhesive uses microscopic fibrous structures which increases the contact area of the adhesive surface and creates adhesion through the Van der Waals forces. The best known dry adhesive is found on the bottom of gecko feet.

Summary of Research

D. Ruffatto et al. ("Experimental Results of a Controllable Electrostatic/Gecko-like Adhesive on Space Materials," IEEE Aerospace Conference Proceedings, March 2014) discloses focuses on the experimental results of controllable (i.e. on-off) adhesives, which combines the benefits of both electrostatic and directional dry adhesives (i.e. gecko-like adhesives).

K. Autumn and A. Peattie ("Mechanisms of Adhesion in Geckos," INTEGR. COMP. BIOL., vol. 42, pp. 1081-1090, 2002.) relates to investigations on how the force is generated by microscopic structures (e.g. setae on geko's feet).

M. Dadkhah, Z. Zhao and N. Wettels ("A Self-Aligning Gripper Using an Electrostatic/Gecko-Like Adhesive," in IEEE/RSJ International Conference on Intelligent Robots and Systems, Deajeon, Korea, 2016) introduces a new robotic gripper for flat surfaces based on an electrostatic/gecko-like adhesive.

C. Calle, J. McFall and C. Buhler, ("Dust Particle Removal by Electrostatic and Dielectrophoretic Forces with Applications to NASA Exploration Missions," in Proc. ESA Annual Meeting on Electrostatics, 2008) discloses a dust removal technology that uses electrostatic and dielectrophoretic forces to remove dust already deposited on surfaces and to prevent the accumulation of dust particles approaching those surfaces.

G. Valiant ("Designing Proper Athletic Shoe Outsole Traction," Valiant Nike Sport Research Lab, December 1997) relates to designs for improving athletic shoe outsole traction.

R. L. Rui Chen and H. S. Rong Zhang, ("Wall Climbing Robot Using Electrostatic Adhesion Force Generated by Flexible Interdigital Electrodes," International Journal of Advanced Robotic Systems, vol. 10, no. 1, 2013) relates to a double tracked wall climbing robot based on electrostatic adhesion technology.

Other research can be found here:
R. Chen, R. Lui, J. Chen and J. Zhang, "A gecko inspired wall-climbing robot based on electrostatic adhesion mechanism," in IEEE International Conference on Robotics and Biomimetics, Shenzhen, 2013.
D. Ruffatto, J. Shah and M. Spenko, "Optimization and experimental validation of electrostatic adhesive geometry," in IEEE Aerospace Conference, Big Sky, 2013.
R. Pelrine, "SRI International—NASA,". Available: https://www.nasa.gov/pdf/626527main_3B-5_Pelrine.pdf.
C. Kendall, "Parasitic Power Collection in Shoe Mounted Devices," Massachusetts Institute of Technology, 1998.
J. Kymissis, C. Kendall and J. Paradiso, "Parasitic Power Harvesting in Shoes," Physics and Media Group MIT, 2014.
J. Paradisoand and T. Starner, "Human-Generated Power for Mobile Electronics," in Low-Power Electronics Design, CRC Press, 2004.
R. Kornbluh, R. Pelrine and Q. Pei, "Electroelastomers: applications of dielectric elastomer transducers for actuation, generation, and smart structures," in Smart Structures and Materials 2002, San Diego, 2002.
J. Franz, C. Wierzbinski and R. Kram, "Metabolic Cost of Running Barefoot versus, "Medicine and Science in Sports and Exercise, 2012.
E. Frederick, "Optimal Frictional Properties for Sport Shoes and Sport Surfaces," in ISBS Conference Proceedings, 1993.
B. Barry and P. Milburn, "Tribology, friction and traction: understanding shoe-surface interaction," Footwear Science, vol. 5, no. 3, pp. 137-145, 2013.

Electrostatic Dry Adhesive

FIG. 1 shows an example of an electrostatic adhesive 110 which may be used as part of the shoe. In this case, the electrostatic adhesive is an electrostatic dry adhesive (EDA).

The grip enhancing features of FIG. 1 combines two adhesive technologies: dry adhesives consisting of very fine microscopic structures which adhere through Van der Waals forces and electrostatic adhesives which adhere through electrostatic attraction. As noted above, the combination is actively being researched because the combination of electrostatic and dry adhesion may provide synergistic performance in comparison to each technology individually. The electrostatic element pulls the adhesive into the substrate, which allows for more of the dry adhesive micro-structure to engage the surface. As the micro-structure is loaded, the adhesive is pulled into even closer contact with the substrate. Consequently, the distance between the surface and the electrostatic element's electrodes is further reduced, thus increasing its adhesive force. This creates a positive feedback cycle in which the two adhesive mechanisms complement each other's performance.

In FIG. 1 there is illustrated an electrostatic dry adhesive device (EDA) 110. In the electrostatic dry adhesive 110, microstructured dry adhesive elements 112, such as in the form of microwedges may be formed directly, such as by being molded, into the polymer contact surface 114 (e.g. silicon-based) behind which a set of electrostatic adhesive electrodes 116 are embedded in a flexible polymer 118 (e.g. silicon). In the electrostatic dry adhesive device 110, the electrostatic adhesive is able to provide a normal adhesion force to preload the dry adhesive element 112 and pull the electrostatic dry adhesive device 110 onto a substrate. The directional dry adhesive 112 desirably provides conformation to micro scale features, easy release properties and a high area of contact. The microwedges may be between 10-100 μm long.

Dry adhesives, such as the microwedges shown in FIG. 1, can stick to many surfaces with varying roughness. Dry adhesives generally comprise many small microscopic structures, typically triangular wedges. On rough surfaces, the structures engage the surface where they interlock with the texture and resist shearing though frictional effects. On smooth surfaces, the microstructure allows the gripping material to deform plastically so that the structure is in intimate contact with the surface and Van der Waals forces can develop.

Electrostatic adhesives can also operate on surfaces with varying roughness including conductive, semi-conductive, and insulating surfaces. They function by generating an electric field across a set of electrodes embedded in a dielectric. On conductive materials, this causes electrons to migrate under the positive electrodes and electron holes to form under the negative electrodes. The resulting charge creates an attractive force between the electrodes and substrate. On non-conductive surfaces, the electric field polarizes the substrate material, which generates an attractive force that is proportional to the square of the electric field strength.

Traditional, friction-only based shoes can generate at least 60 kPa of lateral shear resistance during an abrupt lateral movement (based on a friction coefficient of 0.75). A review of current literature (see above) for EDAs lists shear resistances between 5-22 kPa. The shear resistances measured for EDAs do not include frictional effects caused by a normal force as would be experienced with a traditional shoe. Therefore, the shear resistances of the EDA would be in addition to those created by usual normal force frictional effects in this application. Some friction decrease would be likely with an EDA equipped outsole as measured in the traditional sense (i.e. neglecting additional forces due to the EDA) because the material limitations required for EDAs. However, the friction coefficient of the EDA equipped outsole could drop by 8%-36% as compared to a traditional shoe and the EDA would still offer a net gain in traction.

The EDA may be particularly advantageous for shoes for use on hard court-type surfaces. That is, on rough or uneven surfaces e.g. hiking trails, rough rocks etc. friction is typically higher so EDAs may add proportionally less traction.

Even if the micro-structure of the EDA is removed (or a non-micro-structure electrostatic adhesive is used) the electrostatic portion may remain and grip enhancement may still be possible and beneficial, but to a lesser extent.

Piezoelectric Power Harvesting from Walking Gait

To power the electrostatic adhesive, power is harvested through a piezoelectric material imbedded in the shoe (e.g. in the sole of the shoe). When the piezoelectric material undergoes strain (e.g. compression) by the force of the step an electric potential is created across the piezoelectric material. The electric potential can be stored in a battery or other electrical energy storage device to be discharged as required through the electrostatic adhesive. Power could also be supplied by a battery charged by traditional means.

Figure 2:
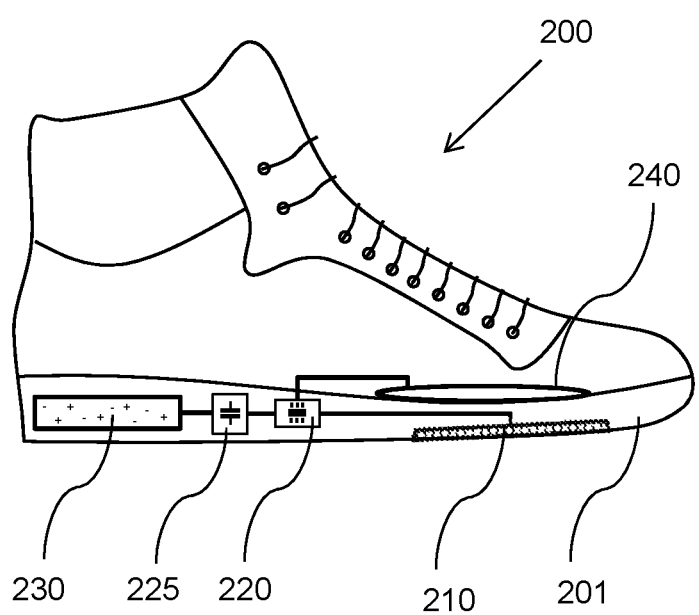
FIG. 2 is a side view of a shoe with a schematic circuit diagram of various components which cooperate to enhance the grip of the shoe.

FIG. 2 depicts a shoe 200 comprising:
- an electrical energy storage device 225 (in this case a capacitor);
- a piezoelectric generator 230 configured to generate electricity when the user takes a step in the shoe 200 and to transmit the generated electricity to the electrical energy storage device;
- a sole 201 comprising an electrostatic adhesive portion 210 configured to augment the grip of the shoe 200 in response to being activated by electricity received from the electrical energy storage device.

In this case, the piezoelectric generator 230 is positioned in the heel of the sole 201 and is configured to generate electricity as the user puts their weight on the sole portion of the shoe sole. The electricity generated is then harvested by the connected capacitor. It will be appreciated that in other embodiments, the energy may be stored in a rechargeable battery.

The piezoelectric energy harvesting element may be located anywhere in the shoe (e.g. between the bottom of the shoe and the foot). The piezoelectric energy harvesting element may be positioned within thicker parts of the sole (where there is space) and/or where the greatest impact of footfall occurs (e.g. under the ball and/or the heel of the foot).

In this case, the shoe also comprises a controller 220 configured to control when the electrostatic adhesive portion 210 is activated. In this case, the controller receives data from a sensor placed at the front insole.

Power harvesting from walking using piezoelectric material has been studied extensively by government and research institutions as a method to power mobile electronics. The technology has been developed such that numerous pre-commercial prototypes have been tested.

Preferably, the piezoelectric generator should be configured to create more power than will be used by the electrostatic adhesive, allowing for electrical losses and inefficiencies.

Generally, more than 3000 V are required to operate the electrostatic adhesive while the peak voltage of a piezoelectric generator is approximately 50 V. Storage of the power in a battery will require the voltage to be between 3.6-12 V. Therefore, the shoe may comprise one, two or more voltage convertors. Fore example, these may include a step-down convertor configured to step down the voltage generated by piezoelectric generator for the energy storage device (e.g. battery) and a step-up convertor configured to step up the voltage from the battery for the electrostatic adhesive. Using a capacitor, as in this case, may reduce the need for a step-down convertor.

Electrical power is required each time the electrostatic adhesive is activated. Relatively little power is required to maintain the activated state. Power requirements depend on the electrostatic adhesive electrode design, size, material, charge voltage and the surface being gripped. Power requirements may be around 0.02 mW/N for the power requirement per lateral adhesive force.

The electrostatic adhesive may be cycled on and off for each step, i.e. the electrostatic adhesive may be activated only when the shoe is in direct contact with the ground and de-activated before the shoe is lifted from the ground. Not de-activating the electrostatic adhesive may conserve power (but may make the shoe stickier when being lifted).

The power available through harvesting energy from walking is well defined in literature. Using polyvinylidene fluoride (PVDF) membranes power harvesting up to 0.6 mW has been achieved. Using lead zirconate titanate (PZT) piezoelectric generators powers between 1.8-8.4 mW have been achieved. Harvested power up to 800 mW has been achieved using electroactive polymers/dielectric elastomers.

To ensure that the electrostatic adhesive is fully powered, the shoe may be configured only to activate the electrostatic adhesive in response to detecting certain threshold conditions. That is, in some embodiments, the electrostatic adhesive may not activate each step. For example, in the embodiment of FIG. 2, the electrostatic adhesive 210 may be activated only when the force applied to the force sensor 240 exceeds a predetermined threshold. This may help ensure that the additional grip is available when it is really needed and help ensure that the power used by the electrostatic adhesive can be more fully provided by the piezoelectric generator 230.

The electrostatic adhesive may be positioned anywhere on the sole. The electrostatic adhesive may be positioned below the ball of the foot. The electrostatic adhesive may extend across most of the sole surface (e.g. greater than 50% of the sole area).

Potential Issues Caused by Additional Grip

Additional grip is generally considered an advantage in athletic shoes from a performance perspective. However too much grip, especially rotational grip, may lead to an increased susceptibility to sports injuries.

Excessive rotational grip is strongly linked to knee injuries but is not needed in most athletic movements. Cutting movements and other directional changes are purely translational. They require only that the shoe does not slip on the surface during the movement in the plane in which horizontal forces are directed. Rotation is not an issue in preventing slipping. The foot is not spun when changing direction or accelerating while running. The grip may be enhanced by increasing translational grip while keeping rotational grip low.

Excessive translational grip also increases sports injuries, mostly to the ankles. From an injury prevention standpoint literature recommends keeping rotational grip as low as possible just above a minimal threshold around 10-12 Nm and translational grip slightly higher than its minimal required value. Sport shoe designs that have a translational friction coefficient of 0.8 on typical surfaces and exhibit minimal rotational grip should allow maximal performance while minimizing the risk of injury.

Figure 3:
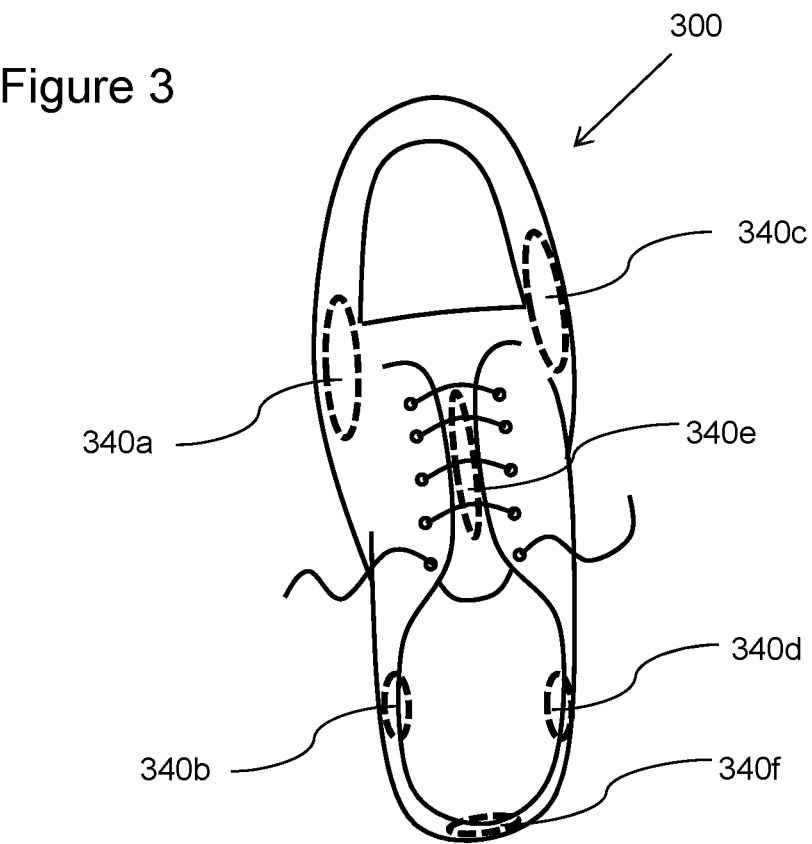
FIG. 3 is an overhead view of a shoe indicating the location of various sensors.

FIG. 3 shows an embodiment which is similar to the embodiment of FIG. 2 except that there is a larger array of force sensors. In particular, this shoe 300 includes the following force sensors:
- a front left side sensor 340a;
- a rear left side sensor 340b;
- a front right side sensor 340c;
- a rear right side sensor 340d;
- a tongue sensor 340e configured to measure the force applied by the foot to the shoe in a forward direction (e.g. when braking); and
- a heel sensor 340f configured to measure the force applied by the foot to the shoe in a backwards direction (e.g. during acceleration).

In this case, the torsion on the shoe can be determined by the side sensors 340a-d. For example, if the user is applying a clockwise torsion to the shoe, a greater force will be detected at the front right side sensor 340c and at the rear left side sensor 340b. Likewise, if the user is applying a counter- or anti-clockwise torsion to the shoe, a greater force will be detected at the front left side sensor 340a and at the rear right side sensor 340d.

In this case, the controller (not shown) is configured to deactivate the electrostatic adhesive portion in response to detecting a torsional force exceeding a predetermined threshold. This may help reduce injury by ensuring that the additional grip due to electrostatics is applied when translational grip is required and not applied when the shoe is being rotated.

Retrofittable Shoe Attachment

Figure 4:
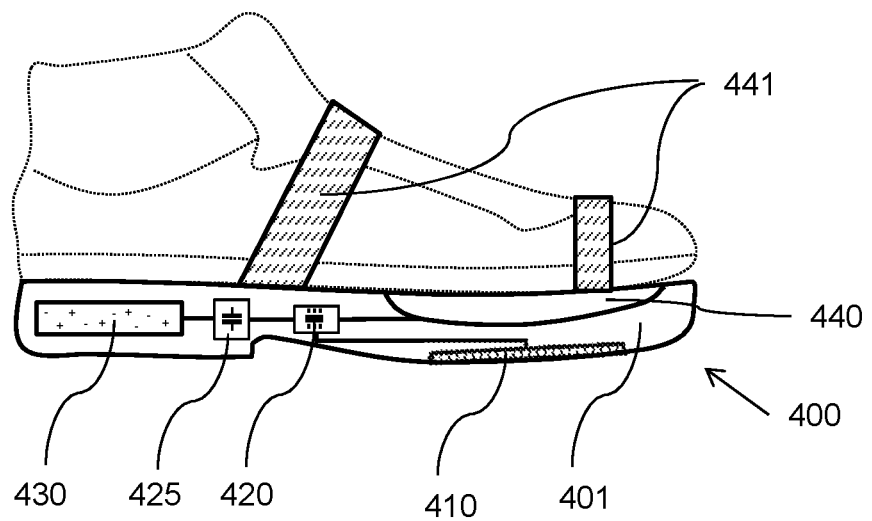
FIG. 4 is a side view of a retrofittable shoe attachment.

FIG. 4 depicts a retrofittable shoe attachment 400. The shoe to which the a retrofittable shoe attachment 400 is attached is shown in dotted lines. The retrofittable shoe attachment 400 in this case comprises:
- an electrical energy storage device 425 (in this case a capacitor);
- a piezoelectric generator 430 configured to generate electricity when the user takes a step in the shoe and to transmit the generated electricity to the electrical energy storage device;
- a sole 401 comprising an electrostatic adhesive portion 410 configured to augment the grip of the shoe in response to being activated by electricity received from the electrical energy storage device; and
- one or more connectors 441 configured to connect the retrofittable shoe attachment to an existing shoe sole.

The electrostatic adhesive 410 may be activated only when the force applied to the force sensor 440 exceeds a predetermined threshold. In this case, the retrofittable shoe attachment is controlled by an optional controller 420.

In this case, the connector 441 comprises two elastic straps configured to go around a shoe (shown in dotted lines) to retrofit the shoe attachment 400 to the shoe. It will be appreciated that other connectors may be used.

Schematic Diagram

Figure 5:
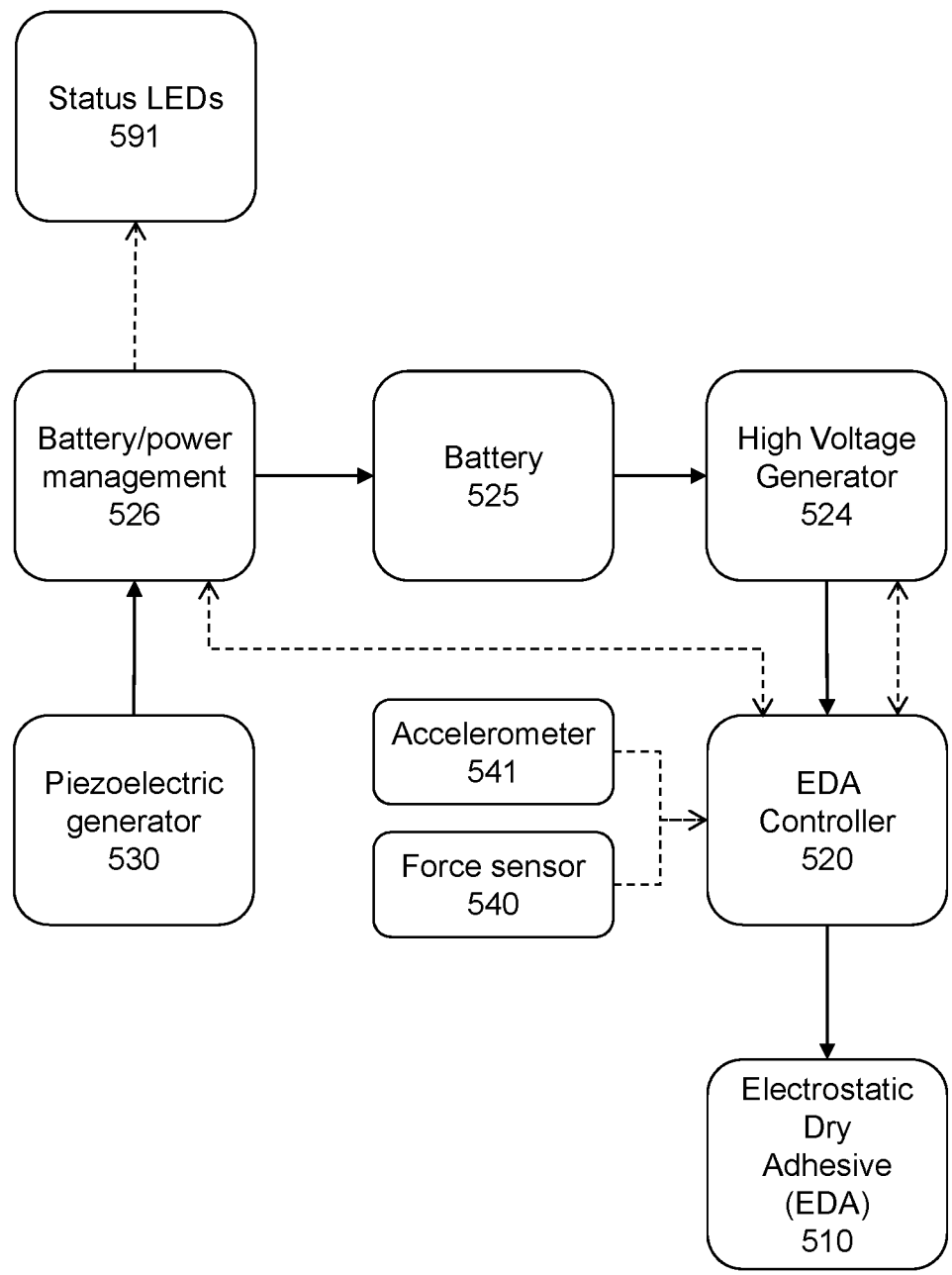
FIG. 5 is a schematic diagram of the power and control systems present in an embodiment of the shoe.

FIG. 5 is a schematic diagram of the power and control systems present in an embodiment of the shoe. In FIG. 5, power transfer is shown in solid lines and data transfer is shown in dashed lines.

In this embodiment, power is generated by piezoelectric generator 530. This power is passed to the battery/power management system 526 which is configured to charge the battery 525 (the electrical energy storage device), if required. The battery/power management system monitors the state of charge of the battery and controls power delivery to the battery. The battery/power management system also controls a visual display (in this case status LEDs 591) to display to the user the state of charge of the battery.

The electrostatic adhesive 510 in this case is controlled by an electrostatic adhesive controller 520. The electrostatic adhesive controller activates the electrostatic adhesive in response to data received from various sensors (an accelerometer 541 and a force sensor 540 in this case). Power to activate and deactivate the electrostatic adhesive is delivered to the electrostatic adhesive having been received from the battery 525 via a high voltage generator 524. The electrostatic adhesive controller also has a two-way data link with the battery/power management system 526 and the high voltage generator 524.

Other Options

A shoe may be configured to activate the electrostatic adhesive portion a predetermined time period after impact of the shoe sole on an underlying surface. For example, in a running shoe, grip is most required just before take-off. Therefore, the shoe may configured activate the electrostatic adhesive 50-150 ms after initial impact is detected (e.g. using a force detector in the sole of the running shoe).

The shoe may comprise a charging interface to allow charging of the electrical energy storage device. This may allow the electrical energy storage device to be charged prior to use. The charging interface may comprise electrical terminals for wired charging or a wireless charging interface. By allowing charging, all of the power required for the grip enhancement need not be generated by the piezoelectric generator.

When electrostatic adhesive is used in dirty or dusty environments the electrostatic attraction may cause dust to adhere to the surface. Over time the dust will form a layer which will poison the adhesive properties by clogging the micro-surface and increasing the distance between the electrostatic electrodes and the surface. This effect may be mitigated using a cleaning cycle comprising alternating the electrostatic field of the electrostatic adhesive to repel dust and dirt from the surface. That is, the shoe may be configured to apply a cleaning cycle to the electrostatic adhesive, the cleaning cycle comprising alternating the electrostatic field of the electrostatic adhesive portion to repel dust and dirt from the surface.

Although in previous embodiments, the electrostatic adhesive portion is configured to increase adhesion between the sole and the underlying surface, other options may be used. For example, the electrostatic adhesive portion may be placed within the shoe to adhere to the foot to limit movement of the foot within the shoe. In retrofittable embodiments, the adhesive portion may be placed between the retrofitted portion and the attached shoe to limit movement between the retrofitted portion and the shoe. For example, a further electrostatic adhesive portion may be placed on top of the sole of the retrofitted portion to connect with the sole of the attached shoe. Top and bottom in this case is defined based on a user walking upright on a horizontal surface.

Although the present invention has been described and illustrated with respect to preferred embodiments and preferred uses thereof, it is not to be so limited since modifications and changes can be made therein which are within the full, intended scope of the invention defined by the claims as understood by those skilled in the art.

The invention claimed is:

1. A shoe apparatus comprising:
an electrical energy storage device;
a piezoelectric generator configured to generate electricity when a user takes a step on an underlying surface and to transmit the generated electricity to the electrical energy storage device; and
a sole with a bottom surface that is configured to contact the underlying surface, the sole comprising an electrostatic adhesive portion on said bottom surface, said electrostatic adhesive portion being configured to augment grip of the sole with the underlying surface in response to being activated by electricity received from the electrical energy storage device.

2. The shoe apparatus according to claim 1, wherein the electrical energy storage device is a battery or a capacitor.

3. The shoe apparatus according to claim 1, wherein the electrostatic adhesive portion is configured to be activated in response to a force being applied to the sole exceeding a predetermined threshold.

4. The shoe apparatus according to claim 1, wherein the shoe apparatus comprises sensors configured to detect torsional force applied to the sole, wherein the shoe apparatus is configured to deactivate the electrostatic adhesive portion in response to detecting a torsional force exceeding a predetermined threshold.

5. The shoe apparatus according to claim 1, wherein the shoe apparatus comprises sensors to determine forces applied to the shoe apparatus by a foot of the user.

6. The shoe apparatus according to claim 1, wherein the electrostatic adhesive portion comprises an electrostatic dry adhesive.

7. The shoe apparatus according to claim 1, wherein the shoe apparatus is configured to activate the electrostatic adhesive portion after a predetermined time period after initial impact of the sole on said underlying surface.

8. The shoe apparatus according to claim 1, wherein the shoe apparatus comprises a charging interface to allow charging of the electrical energy storage device.

9. The shoe apparatus according to claim 1, wherein the shoe apparatus is configured to apply a cleaning cycle to the electrostatic adhesive portion, the cleaning cycle comprising alternating an electrostatic field of the electrostatic adhesive portion to repel dust and dirt from the bottom surface.

10. The shoe apparatus according to claim 1, wherein the shoe apparatus is configured to deactivate the electrostatic adhesive portion in response to detecting that the user is lifting the sole from said underlying surface.

11. The shoe apparatus according to claim 1, wherein the shoe apparatus is configured to deactivate the electrostatic adhesive portion in response to detecting a decrease in pressure at a bottom of a heel of the sole.

12. A shoe comprising the shoe apparatus according to claim 1.

13. A retrofittable shoe attachment comprising:
the shoe apparatus according to claim 1; and
one or more connectors configured to connect the retrofittable shoe attachment to an existing shoe sole of an existing shoe.

14. The retrofittable shoe attachment according to claim 13, wherein the shoe apparatus comprises a further electrostatic adhesive portion placed on a top surface of the sole of the shoe apparatus, and the further electrostatic adhesive portion is configured to limit movement between the retrofittable shoe attachment and the existing shoe.

* * * * *